April 7, 1964 G. D. BRUCE 3,128,391

TRIGGERED PULSE GENERATOR TRANSISTOR CIRCUIT

Filed Dec. 17, 1954 2 Sheets-Sheet 1

INVENTOR.
GEORGE D. BRUCE

BY

P. E. Henninger,
ATTORNEY

INVENTOR.
GEORGE D. BRUCE
BY
P. E. Henninger,
ATTORNEY 3,128,391
Patented Apr. 7, 1964

3,128,391

TRIGGERED PULSE GENERATOR TRANSISTOR CIRCUIT

George D. Bruce, Wappingers Falls, N.Y., assignor to International Business Machines Corporation, New York, N.Y., a corporation of New York Filed Dec. 17, 1954, Ser. No. 476,010
15 Claims. (Cl. 307—88.5)

This invention is concerned with an electronic circuit, and more specifically with an electronic device which may be termed a "dynamic storage cell" for pulse-type operation.

A unit according to this invention may have various uses, among which is that as a major building block in various types of electronic computers.

In various electronic computers binary operation may be had in various ways, one of which is to use a bistable trigger in a D.C. stable operation. Another device which is employed is that to which this invention is applicable. It is an arrangement wherein the arrival of a single pulse will trigger a series of continuous pulses, in the nature of clock control signals, and this condition will continue (i.e. pulses will be generated) until a second pulse, or reset, is introduced to terminate the generation of these pulses. It is the latter type of operation which may be had by means of a dynamic storage cell according to this invention.

An operation of this sort is applicable to shifting registers, counters and similar devices.

It is an object of this invention to provide an electronic device which makes use of a transistor, and consequently eliminates any delay lines, which were heretofore necessary, in order to accomplish similar results by employing conventional tubes.

Another object of this invention is to provide a unit which can perform a desired function of triggering a series of pulses upon arrival of a given input pulse, and terminating the production of such a series of pulses upon the subsequent arrival of another input pulse. The only circuit arrangements that could perform such a function heretofore made use of at least two transistors, or employed electron tubes and special cores. Consequently, a great saving in the elements necessary for accomplishing a given function is had by employing a dynamic cell according to this invention.

Briefly, this invention is concerned with a dynamic storage cell having a clock pulse receiving input circuit, a trigger input pulse circuit and an output pulse circuit. The dynamic storage cell comprises a transistor that has a control electrode, and an output electrode connected to the above-mentioned output pulse circuit. The storage cell also includes a transformer having a plurality of windings thereon and circuit means including one of said transformer windings for joining the clock pulse circuit with the trigger pulse circuit and the control electrode. The whole storage cell is arranged so as to create output pulses in said output circuit whenever clock input pulses are received following receipt of an input trigger pulse.

Certain embodiments of this invention are described in detail below and illustrated in the drawings, in which.

Figures 4, 4A, 5, 5A:
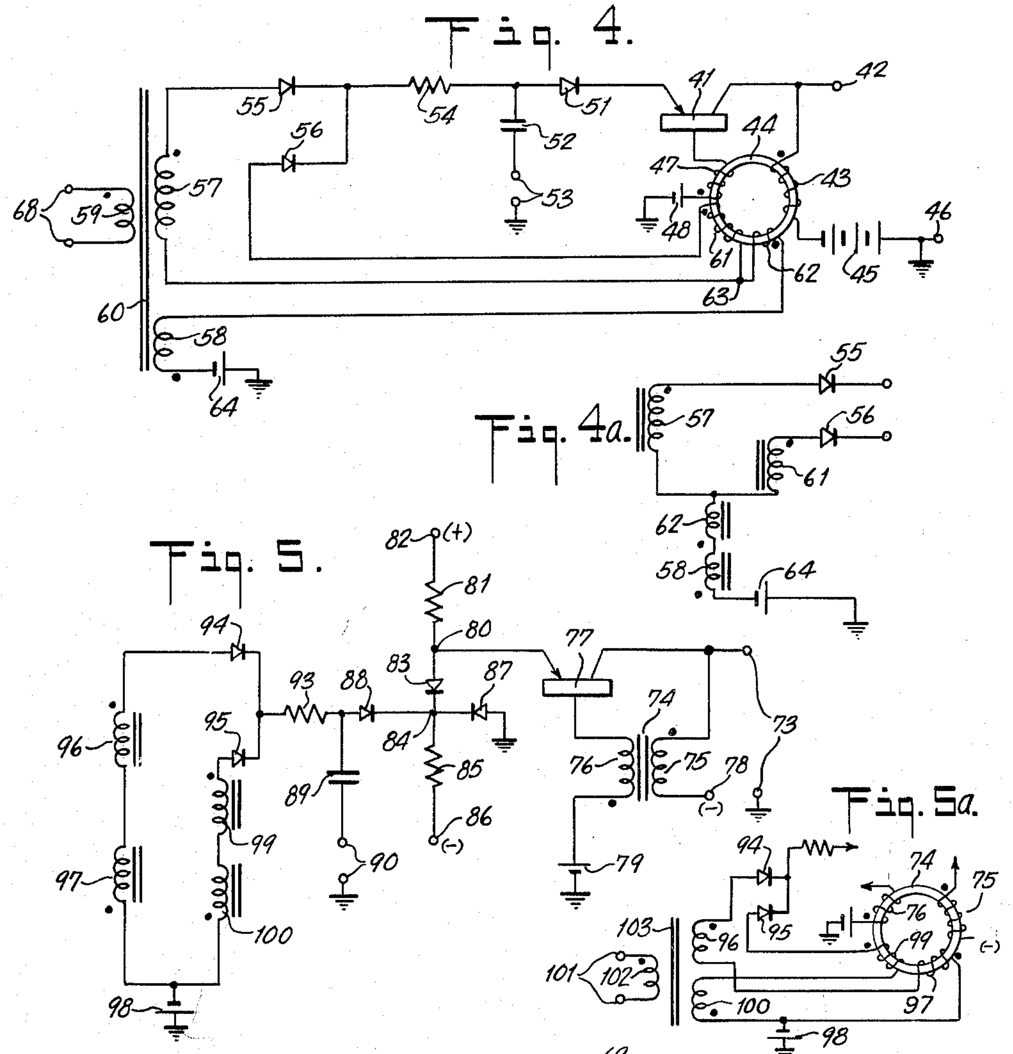
FIG. 4 is a circuit diagram showing a modification of the invention.
Figure 6:
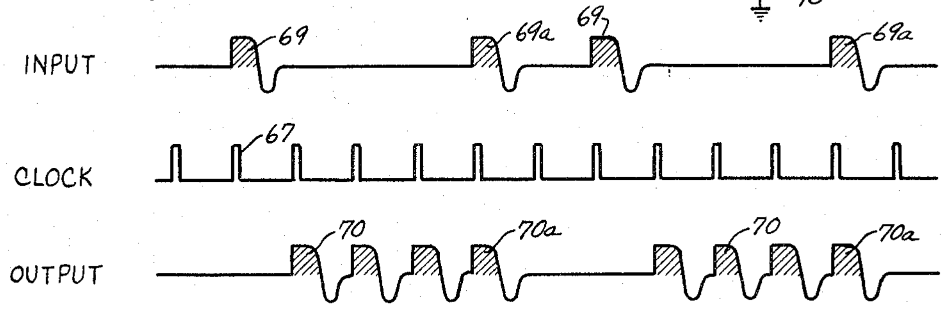

FIG. 4*a* is a circuit diagram illustrating a portion of the circuit according to FIG. 4, redrawn for purposes of explanation;

FIG. 5 is a circuit diagram showing another modification of the invention;

FIG. 5*a* is a circuit diagram showing a portion of the elements of the FIG. 5 circuit as they will be actually connected; and FIG. 6 is a timing diagram illustrating the action and wave form of the various pulses as applied to and derived from the circuits illustrated in FIGS. 4 and 5.

Figure 1:
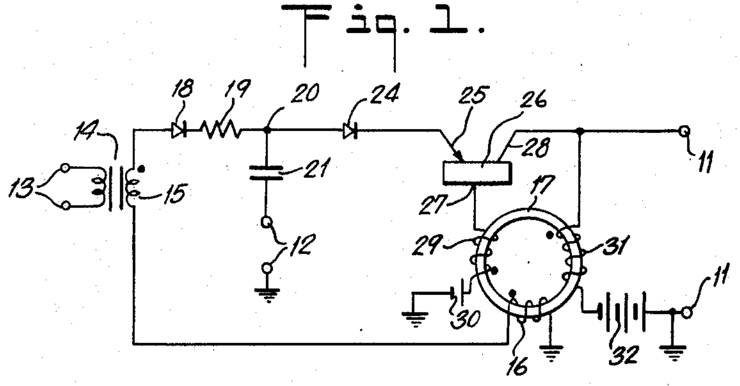
FIG. 1 is a circuit diagram showing a basic arrangement according to the invention.
Figure 2:
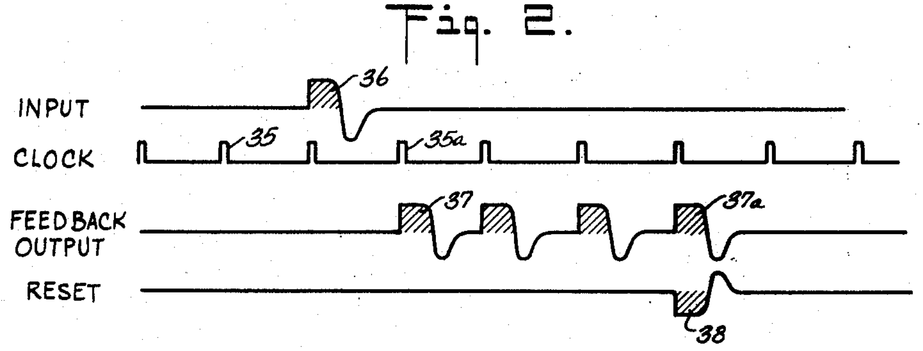
FIG. 2 is a timing diagram illustrating the wave form and the relationship between the various pulses applied to the circuit.

In FIG. 1, there is illustrated a basic circuit according to this invention. It embodies a dynamic storage cell that will produce a series of output pulses at a pair of output terminals 11. The spacing between these output pulses is determined by a continuous series of so-called clock pulses that are illustrated in FIG. 2, and that are introduced to the circuit of FIG. 1 at a pair of clock pulse input terminals 12. Clock pulses of this type are commonly employed in various circuits, and any convenient means for generating them may be employed.

There is a pair of input terminals 13 where a trigger pulse is introduced to the primary winding of a transformer 14. The transformer 14 has a secondary winding 15 that is connected in series with a winding 16 on a core 17 that is constructed of ordinary transformer material. Thus the core 17 is part of another transformer which has a plurality of windings thereon including the winding 16. One end of the winding 16 is connected to ground as illustrated while the other end thereof is connected to one end of the secondary winding 15, and the other end of winding 15 is connected to the anode of a diode 18. This circuit may be continued from the cathode of the diode 18, over a resistor 19, to a junction point 20. A capacitor 21 has one terminal connected to the junction point 20 and its other terminal connected to one of the clock pulse input terminals 12. The other clock pulse terminal 12 is connected to ground as illustrated, in order to provide a complete circuit for introduction of the clock pulses.

Another circuit may be traced from the junction point 20 to the anode of another diode 24, and from the cathode of that diode to an emitter electrode 25 of a transistor 26. Transistor 26 has a base electrode 27 and a collector electrode 28. In circuit with the base electrode 27 of the transistor 26, there is a winding 29 on the core 17 that has a given polarity as indicated by the dot near one end thereof. The other end of winding 29 is connected to a low potential bias battery 30, which has its positive terminal connected to the winding 29 and its negative terminal connected to ground, as illustrated. In circuit with the collector 28 there is another winding 31 on the core 17, which has the same polarity as the winding 29. Winding 31 is connected at the other end thereof to a source of negative potential, such as a battery 32 illustrated. The positive terminal of battery 32 is connected to ground as illustrated, as is also one of the output terminals 11. The other terminal of the battery 32, i.e. the negative terminal, is connected via winding 31 to the collector 28 of the transistor 26 to provide a negative potential on the collector 28, in a conventional manner for transistors.

The portion of the circuit just described including elements 12, 18, 19, 21 and 24 comprises a condenser storage circuit as disclosed and claimed in a copending application of David J. Crawford, Serial No. 340,503, filed March 5, 1953, now Patent No. 2,922,985, entitled "Shifting Register and Storage Device Therefor," and assigned to the assignee of the present application. Similar condenser storage circuits are also included in the modifications of FIGS. 4 and 5 of the present application.

The operation of the storage cell as described in connection with FIG. 1 is illustrated by the diagrams of FIG. 2. This operation may be explained as follows in connection with the circuit of FIG. 1, and with reference to the diagrams of FIG. 2:

A series of clock pulses 35 (FIG. 2) is continuously applied to the clock pulse terminals 12, but the amplitude of these pulses is not sufficient to drive the potential of emitter 25 of the transistor 26 sufficiently positive to overcome the bias of bias battery 30, on the transistor 26. However, following a charging of capacitor 21 to a positive potential, by application of an input pulse 36 as generated in winding 15, the next succeeding clock pulse **35*a* will raise the potential of point 20 sufficiently to cause the transistor 26 to conduct. The transistor is coupled to act as a blocking oscillator so that a pulse like the pulses 37 illustrated will be generated in the winding 31 on core 17. That is, when the transistor 26 begins to conduct, current will flow in winding 31. This current flow will induce a voltage in the winding 29 to aid this current so that the transistor 26 will quickly be driven into saturation and a square wave output pulse will be generated at the output terminals 11**.

At the same time that the output pulse is generated by the current flow in winding 31, a pulse 37 is generated in the feedback winding 16. Generation of the pulse 37 in the winding 16 creates a charging potential for the capacitor 21. Consequently, following the discharge of the capacitor 21 (when transistor 26 was first conducting), the feedback pulse 37 will recharge the capacitor 21. In this way a positive charge is restored on the capacitor 21, such that this blocking oscillator action will be continuously repeated upon the receipt of subsequent clock pulses 35.

It will be noted that the time constant of the charging circuit for the capacitor 21 is made sufficiently long by the magnitude of the resistor 19, so that no unwanted transient effects will cause undesired operation of the circuit.

In order to terminate the generation of the series of output pulses at the terminals 11, it is only necessary to apply a reset pulse 38 which coincides in time with the feedback pulse as generated in the winding 16. It will be observed that pulse 38 is a negative pulse so that the effect of corresponding feedback pulse **37*a* is cancelled and the capacitor 21 is not recharged. Consequently, following the introduction of a reset pulse, as for example, to input terminals 13, clock pulses 35 will no longer cause any output pulses to be generated since the transistor 26** will not be driven to a conductive state.

Figure 3:
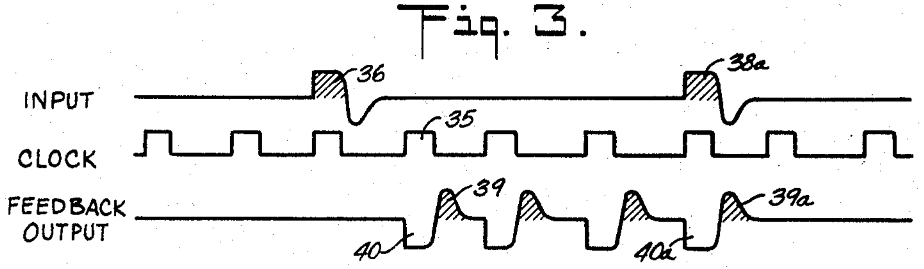
FIG. 3 is another timing diagram illustrating a different operation which may be had with the circuit according to FIG. 1.

Referring to FIG. 3, it will be noted that operation of the FIG. 1 circuit may be had also with the polarity of winding 16 reversed. Under such conditions, the operation will be that illustrated in FIG. 3 where the feedback pulses 40 will be negative, but the inductive overshoot of the circuitis will cause a positive swing such as indicated by the shaded portion 39 of pulses 40 in FIG. 3. In this instance it is this overshoot which produces the positive potential necessary to charge capacitor 21 again each time, so that the action will be maintained as each clock pulse is received. Termination of the generation of the series of output pulses is accomplished in a similar manner as before. However, in this instance, as shown in FIG. 3, the reset pulse **38*a* is now merely a second or subsequent input pulse which is applied at the same time as one of the feedback pulses 40*a* is generated. The charging effect of the inductive overshoot portion 39*a* of feedback pulse 40*a* is cancelled out by the recurring input pulse 38*a* which has a corresponding negative inductive overshoot, so that capacitor 21** is not recharged and the generation of the series of pulses is terminated.

In FIGS. 4 and 5, there are illustrated two adaptations of the basic unit according to this invention. In these two embodiments, the arrangement is such that the input to the dynamic storage cell is in the nature of an exclusive "or" circuit so that here an input pulse alone or a feedback pulse alone will cause the generation of an output pulse; but the introduction of both an input pulse and a feedback pulse simultaneously will fail to produce an output pulse from the transistor circuit. (Note that this is similar to the operation described above in connection with FIG. 3.) Therefore, a series of output pulses may be commenced by the introduction of an input pulse and then such a series may be terminated by introducing another input pulse (simultaneously with one of the feedback pulses that are being continuously generated with the output pulses of the circuit). This operation will be more fully appreciated upon a more detailed examination of the circuits.

Attention is directed to FIG. 4 where a transistor 41 has its collector connected to an output terminal 42 and to one terminal of a winding 43 on a transformer core 44 The other terminal of the winding 43 is connected to a negative potential such as a battery 45 illustrated. The other, i.e. positive terminal of battery 45, is connected to ground as illustrated. Also, another output terminal 46 is grounded. Connected to the base of the transistor 41 there is a winding 47, the other end of which winding is connected to a small potential bias battery 48, which is connected to ground at its negative terminal.

A diode 51 has its cathode connected to the emitter electrode of the transistor 41 and its anode connected to one terminal of a capacitor 52, the other terminal of which capacitor is connected to one of a pair of clock pulse input terminals 53. The other of the clock pulse input terminals 53 is grounded, as illustrated. There is also a resistor 54 that has one terminal connected to the junction point between diode 51 and capacitor 52. The other terminal of resistor 54 is connected to the cathodes of two diodes 55 and 56.

The anode of diode 55 is connected to one end of an input pulse generating winding 57 that has the number of turns thereof large in comparison with an auxiliary input pulse winding 58. The ratio of turns on these two windings is such that the signals produced in windings 57 are twice the amplitude of the signals produced in winding 58. Input pulses are generated from signals introduced in a primary winding 59 connected to a transformer 60 that carries the secondary input pulse windings 57 and 58.

Connected to the anode of diode 56 is a winding 61 on the core 44 that has a positive polarity output as indicated by the dot near one end thereof. Winding 61 has twice the number of turns as another feedback winding 62, which is also on the core 44. It will be noted that the other end of winding 61, from that connected to the diode 56, is connected to a junction 63 that is common to one end of the winding 57 and one end of the winding 62. The other end of auxiliary feedback winding 62 is connected to one end of the auxiliary input winding 58, and the other end of winding 58 is connected to the negative terminal of a low potential battery 64. The other terminal of battery 64 is connected to ground, as illustrated.

It will be noted that in FIG. 4*a* the input circuit for the dynamic storage cell as been redrawn to more clearly show the action of the exclusive "or" circuit arrangement. The same windings as shown in FIG. 4 have the same reference numbers. It will also be noted that the auxiliary input and auxiliary feedback windings 58 and 62 are connected in series, while the main feedback winding 61 and the main input pulse winding 57 are connected in parallel.

The operation of the circuit illustrated in FIG. 4 may be readily understood, especially in view of the previous explanation of a basic circuit according to FIG. 1. However, it will be observed that in FIG. 4 an exclusive "or" circuit is employed, and the operation to obtain such results may be explained as follows, referring to FIG. 6, as well as FIG. 4:

As was the case above in connection with FIG. 1, the circuit constants are such that so long as a series of clock pulses 67 (FIG. 6) alone are being received at the clock input terminals 53, the transistor 41 does not conduct and no output pulses are generated. When an input pulse is introduced at a pair of input terminals 68, a pulse 69 is generated. Pulse 69 is the result of a double amplitude pulse generated in the winding 57, that is opposed, or inhibited in part, by a single amplitude pulse generated in the winding 58. This result is had by the relative polarities of the windings 57 and 58 as indicated by the dots, as well as the relative amplitude of the pulses therein as indicated by the number of turns of these windings. Referring to FIG. 4*a*, it will be readily observed that the winding 58 is directly in a series circuit with the winding 57 so that a given amplitude pulse 69 results. This pulse will raise the potential of the circuit leading to diode 55 sufficiently to cause a charge to be created on the capacitor 52 via the diode 55 and the resistor 54.

The remainder of the action of the circuit for producing an output pulse (such as pulses 70 illustrated in FIG. 6) will occur upon receipt of subsequent clock pulses 67 in a manner similar to that described above in connection with FIG. 1. It will be noted, however, that the generation of a feedback pulse which occurs in the combined windings 61 and 62 is like that of the input pulse described above, in that winding 61 has twice the number of turns as the winding 62 and is wound for opposite polarity. Therefore, the double amplitude pulse generated in winding 61 is reduced by half by the opposing action of the reversed polarity pulse, generated in the winding 62. Consequently the given amplitude feedback pulse is fed via the diode 56 and the resistor 54 to recharge the capacitor 52 in the manner described above.

Now, it will be observed that when a second input pulse 69*a* is introduced at the same time as one of the feedback pulses 70*a*, the resulting action is such that both the input pulse and the feedback pulse are inhibited by the combined action of the reverse polarity windings 58 and 62. Therefore, there is no charge applied to the capacitor 52, and subsequent clock pulses will not cause the transistor 41 to conduct so as to generate output pulses. Details of this action may be best described with reference to FIG. 4*a*. It is pointed out that the pulses as generated in winding 57 and winding 61 are effectively in parallel so that the result of a simultaneous occurrence of pulses in these two windings is a pulse of amplitude the same as either one of them alone (assuming their amplitudes are equal). Keeping in mind that the amplitudes of the pulses generated in windings 57 and 61 are double that of a given pulse amplitude, it will be observed that the reverse polarity pulses (as generated in windings 62 and 58) are connected in series and add to one another. Therefore, these two reverse polarity pulses act to produce a double amplitude reverse polarity effect, which will entirely cancel the effective pulse as applied by the windings 57 and 61 in parallel.

In FIG. 5, there is illustrated a circuit that may be particularly adapted to use in a computer. The input control arrangement for triggering the generation of pulses is somewhat different from that employed in FIG. 4. In the FIG. 5 arrangement, there is illustrated a pair of output terminals 73 and a transformer 74 having windings 75 and 76 thereon. The end of the winding 75, remote from the collector of a transistor 77, is connected to a terminal 78 which has a negative potential connected thereto as indicated in the drawing.

One end of the winding 76 is connected to the base of transistor 77, while the other end of this winding is connected to the positive terminal of a bias battery 79, the other terminal of which is grounded.

The emitter of transistor 77 is connected to a junction point 80 that lies on a voltage divider. The voltage divider includes a resistor 81 that has one end connected to a terminal 82, which has a positive potential connected thereto as indicated in the drawing. There is a diode 83 having the anode thereof connected to junction point 80 and the cathode connected to another junction point 84. Completing the voltage divider, there is another resistor 85 that has one terminal connected to the junction point 84 and the other terminal connected to a negative potential supply terminal 86.

Junction point 84 is clamped to ground potential, by means of another diode 87 that has its anode connected to ground as illustrated, and its cathode connected to the junction point 84. The connections to diode 87 are such that the potential of point 84 may not fall below ground (or zero potential) since current would flow through the diode 87 to maintain the potential of point 84 at ground level.

A diode 88 has its cathode connected to the junction point 84 and its anode connected to one terminal of a capacitor 89, the other terminal which capacitor is connected to one of a pair of clock pulse input terminals 90. There is a resistor 93 that has one end thereof connected to the common terminal of diode 88 and capacitor 89, and the other end thereof is connected to the cathodes of two diodes 94 and 95. In series with the diode 94 there is an input pulse winding 96 and a reverse polarity feedback pulse winding 97. The other end of this series circuit is connected to ground via a low potential bias battery 98. There is another series circuit that includes the diode 95 in series with a positive polarity feedback winding 99 and a negative polarity input winding 100. The other end of this circuit is also terminated at ground via the bias battery 98.

The transistor 77 (FIG. 5) is connected to operate as a blocking oscillator in a manner similar to that described above in connection with FIGS. 1 and 4, except that the control or input circuit for the transistor 77 includes a voltage divider arrangement whereby the potential at point 80, which potential is applied to the emitter of the transistor 77, is normally at zero or ground potential. Consequently, the transistor 77 is not normally conductive since the bias battery 79 raises the potential of the base of transistor 77 a small amount above zero or ground potential. Then, when the junction point 84 of the circuit is driven to a positive potential, which exceeds that of the bias battery 79, the potential on the emitter of transistor 77 is likewise raised the same amount and current flow through resistor 81 will be shunted to the transistor 77. This will cause the transistor to conduct and produce a single pulse at the output terminals 73 in a manner which has been fully described above.

The arrangement for driving the potential of point 84 positive sufficiently to cause this action, includes a circuit similar to that of FIG. 1 and FIG. 4. The circuit of FIG. 5 includes a capacitor 89 which has clock pulses applied thereto, and which may be charged via the circuits shown that include diodes 94 and 95, as well as input and feedback pulse windings 96, 97, 99 and 100. In this instance, another circuit is had for providing exclusive "or" operation and in this case the action to provide this operation may be traced in the following manner:

Input winding 96 has a positive polarity and produces a pulse having a given amplitude, while at the same time a reverse polarity input pulse of the same amplitude is generated in the winding 100. Under these conditions, when these two pulses alone are received by the circuit, the positive pulse in winding 96 may pass via diode 94 and charge the condenser 89, while the reverse polarity pulse in winding 100 may not pass its series connected diode 95 because of the reverse polarity of this pulse. Therefore, no effect will be had upon the capacitor 89 by the reverse polarity pulse in winding 100. Similarly, when only a feedback pulse is introduced, a positive polarity pulse is generated in the winding 99, which may pass via diode 95 and charge the capacitor 89. Simultaneously, the negative polarity feedback pulse that is generated in the winding 97 cannot effect the charging or discharging of capacitor 89 as it is blocked by the diode 94. Now, however, should both an input pulse and a feedback pulse be applied simultaneously, the reverse polarity pulses, which coincide therewith in each case, will occur in series with the positive polarity pulses and in opposition thereto (because of their negative polarity winding). Consequently, both the input and the feedback pulses will be entirely cancelled, or inhibited, so that no charging of the capacitor 89 will be had.

This arrangement is actually connected in a circuit like that illustrated in FIG. 5*a*. It will be observed that the transformer 74 has, in addition to the windings 75 and 76, the two other feedback windings 99 and 97 wound thereon. Also, it will be noted that there is a pair of input terminals 101 which are connected to a winding 102 that is the primary winding of a transformer 103 which generates the input pulses in the windings 96 and 100. It will be observed that the action which takes place in FIG. 5 is the same as that of FIG. 4 in so far as the generation of output pulses 70 (FIG. 6) and the controlling action of input pulses 69 and clock pulses 67 are concerned.

It will be noted that a dynamic cell according to FIG. 1 may employ either a point contact type transistor or a junction type transistor.

While there has been set forth in some detail various modifications of the invention in accordance with the applicable statutes, this is not to be taken as in any way limiting the invention, but merely as being descriptive thereof.

It is claimed:

1. In a dynamic pulse generating cell having a clock pulse receiving input circuit, a trigger pulse input circuit and an output pulse circuit, the combination comprising a transistor having an emitter, a collector and a base, a transformer having a plurality of windings thereon, two of said windings being connected in series with said collector and said base in a regenerative manner, said clock pulse circuit and said trigger pulse circuit both being connected to said emitter, said transistor having a bias applied the amplitude of which is greater than the clock pulses, a third winding on said transformer, and circuit means for coupling said third winding to the clock pulse circuit in order to create a feedback to keep a series of pulses going following receipt of an input pulse.

2. In a dynamic pulse generating cell having a clock pulse receiving input circuit, a trigger pulse input circuit and an output pulse circuit, the combination comprising a transistor having an emitter, a collector and a base, a transformer having a plurality of windings thereon, two of said windings being connected in series with said collector and said base in a regenerative manner, said clock pulse circuit and said trigger pulse circuit both being connected to said emitter, a capacitor in said clock pulse circuit for receiving a charge from said input pulse circuit, said transistor having a bias applied the amplitude of which is greater than the clock pulses, a third winding on said transformer, and circuit means for coupling said third winding to the clock pulse circuit to provide a feedback for charging said capacitor after each output pulse so that the output pulses are continuously generated once started until the feedback pulse is inhibited.

3. In a dynamic pulse generating cell having a clock pulse receiving input circuit, a trigger pulse input circuit and an output pulse circuit, the combination comprising a transistor having an emitter, a collector and a base, a transformer having a plurality of windings thereon, two of said windings being connected in series with said collector and said base in a regenerative manner, said clock pulse circuit and said trigger pulse circuit both being connected to said emitter, a capacitor in said clock pulse circuit for receiving a charge from said input pulse circuit, a pair of diodes for maintaining the charge on said capacitor until said transistor conducts, said transistor having a bias applied the amplitude of which is greater than the clock pulses, a third winding on said transformer, and circuit means for coupling said third winding to the clock pulse circuit to provide a feedback for charging said capacitor after each output pulse so that the output pulses are continuously generated once started until the feedback pulse is inhibited.

4. A circuit for starting and terminating a train of output pulses in response to single input pulses, comprising a transistor having an emitter electrode, a collector electrode, and a base electrode, a transformer having a first winding connected in series with said collector electrode, a second winding connected in series with said base electrode, said first and second windings being poled in regenerative relation, means reversely biasing the emitter-base impedance of the transistor, a source of clock pulses connected to said emitter electrode, said pulses having a potential small as compared to the reverse bias and ineffective to turn the transistor on, a capacitor connected in series with said clock pulse source and emitter-base impedance, first means responsive to a signal input pulse for charging said capacitor with a potential of polarity and magnitude effective to aid the next clock pulse to overcome said biasing means and turn said transistor ON, and second means including a third winding on said transformer and responsive to an output pulse in said first winding for charging said capacitor with a potential of polarity and magnitude effective to aid the next clock pulse to overcome said biasing means and turn said transistor ON, said second capacitor charging means being effective, after the transistor is once turned ON, to charge the capacitor to turn the transistor ON again in response to each of a train of succeeding clock pulses, thereby producing a train of output pulses, and means, including said first capacitor charging means, for blocking said second capacitor charging means to terminate said train of pulses.

5. A circuit as defined in claim 4, in which said blocking means comprises an EXCLUSIVE OR circuit interconnecting said first and second capacitor charging means and said capacitor, so that said capacitor may be charged by either charging means alone, but is not charged if both charging means are actuated simultaneously.

6. A circuit as defined in claim 5, in which said EXCLUSIVE OR circuit comprises a series branch and two parallel branches connected in series with said series branch, said first capacitor charging means comprises a second transformer having a primary winding connected to receive said signal input pulse, a first secondary winding connected in one of said parallel branches and a second secondary winding having a number of turns substantially equal to one-half the turns of said first secondary winding and connected in said series branch, said second capacitor charging means comprising said third winding of said first-mentioned transformer connected in the other of said parallel branches and a fourth winding of said first-mentioned transformer having a number of turns substantially equal to half the turns of said third winding and connected in said series branch, and two diodes, one connected in each parallel branch and effective to pass only signals of a predetermined polarity to said capacitor.

7. A circuit as defined in claim 5, in which said EXCLUSIVE OR circuit comprises two parallel branches, a second transformer haivng a primary winding connected to receive said input signal pulse and two secondary windings connected in said parallel branches with opposed polarities, said third winding of said first-mentioned transformer and a fourth winding of said first-mentioned transformer, said third and fourth windings being connected in said two parallel branches with opposed polarities and with the polarity of each opposed to the polarity of the winding of the second transformer in the same branch, and two diodes, one connected in each parallel branch and effective to pass only signals of a predetermined polarity to said capacitor.

8. A transistor circuit comprising a transistor having at least emitter, collector and base elements, a collector circuit for said transistor comprising a source of collector operating potential and an inductive element in series with said source and said collector, an emitter circuit for said transistor, means responsive to the occurrence of a voltage pulse developed across said inductive element for increasing the current through said emitter to the saturation level at least during a portion of said pulse, and a resistive element arranged in the path of principal emitter current flow during said pulse for determining the magnitude of said flow.

9. A circuit in accordance with claim 8, in which said means comprises apparatus for feeding back regeneratively, and in series with said resistive element, at least a portion of said voltage pulse developed across said inductor.

10. A circuit in accordance with claim 8, in which said emitter circuit includes means for biasing said emitter element substantially at collector-current cut-off.

11. A transistor wave-form generating circuit, comprising a transistor having at least emitter, collector and base elements, a collector circuit for said transistor comprising a source of collector potential and an inductive element connected in series with said collector element, means coupled to said inductive element for feeding back regeneratively to said emitter element signals produced in said collector circuit in sufficient magnitude to drive said emitter into the saturation current region, and a resistive element connected in series with said emitter element for determining the forward current of said emitter element in the saturation condition.

12. A circuit in accordance with claim 20, in which said coupled means comprises a second inductive element electromagnetically coupled to said first-named inductive element, and in series with said resistive element and said emitter element.

13. A blocking oscillator circuit comprising, in combination, a transistor having base, emitter and collector electrodes, means providing regenerative feedback between said collector and base electrodes, a unilateral conducting device serially connected with said emitter electrode, and a time constant network for said circuit connected with said unilateral conducting device.

14. In a transistor blocking oscillator, a transistor having at least emitter, base, and collector electrodes, means for establishing voltage on said emitter electrode of said transistor, means for establishing voltage on said collector electrode of said transistor, regenerative feedback paths from said collector electrode to said emitter electrode and to said base electrode, said feedback paths comprising a pulse transformer having at least primary and secondary windings, said primary winding being connected to receive the output of said collector electrode, said secondary winding being connected in series circuit with said base and said emitter electrodes, and a unidirectional current flow device connected between said emitter electrode and said secondary winding.

15. In a transistor blocking oscillator, a point contact transistor having at least emitter, collector, and base electrodes, means for establishing voltage on said emitter electrode, means for establishing voltage on said collector electrode, a first regenerative feedback path from said collector electrode to said base electrode, and a second regenerative feedback path from said collector electrode to said emitter electrode, said second feedback path comprising an impedance and a diode.

References Cited in the file of this patent

UNITED STATES PATENTS

| | | |
|---|---|---|
| Re. 24,614 | Haynes | Mar. 3, 1959 |
| 2,670,445 | Felker | Feb. 23, 1954 |
| 2,676,251 | Scarbrough | Apr. 20, 1954 |
| 2,703,368 | Wrathall | Mar. 1, 1955 |
| 2,712,065 | Elbourn et al. | June 28, 1955 |
| 2,777,092 | Mandelkorn | Jan. 8, 1957 |

OTHER REFERENCES

Article: "Junction Transistor Equivalent Circuits and Vacuum Tube Analogy," by Giacoletto; pages 1490–93 of P.I.R.E., vol. 40, No. 11, dated November 1952.